Aug. 29, 1961 G. L. JONES 2,997,886
GYROSCOPES AND GYROSCOPIC INSTRUMENTS
Filed Jan. 20, 1960 2 Sheets-Sheet 1

INVENTOR.
George Lester Jones.
BY
Leonard Knox

Aug. 29, 1961         G. L. JONES         2,997,886
GYROSCOPES AND GYROSCOPIC INSTRUMENTS
Filed Jan. 20, 1960                    2 Sheets-Sheet 2
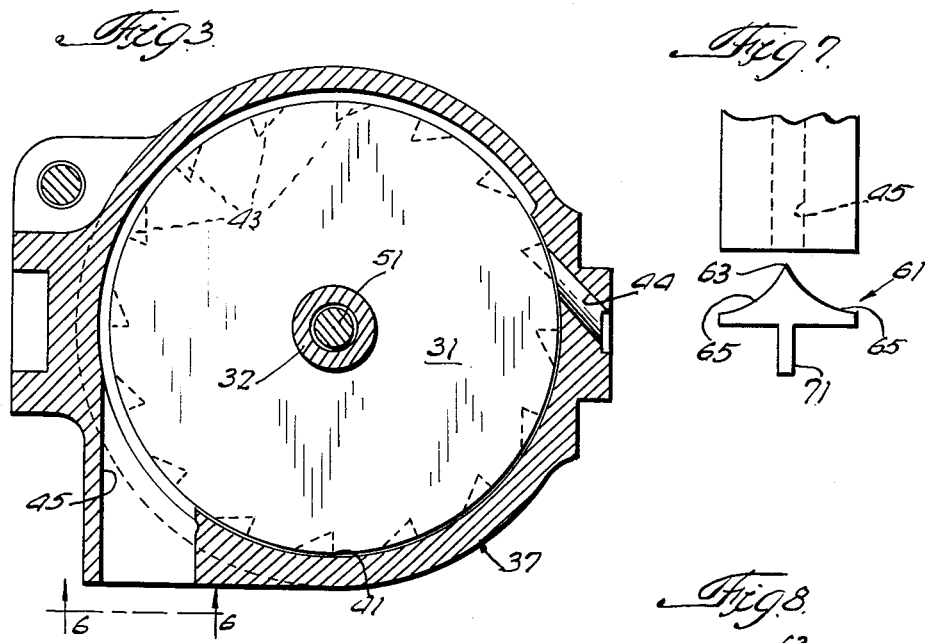
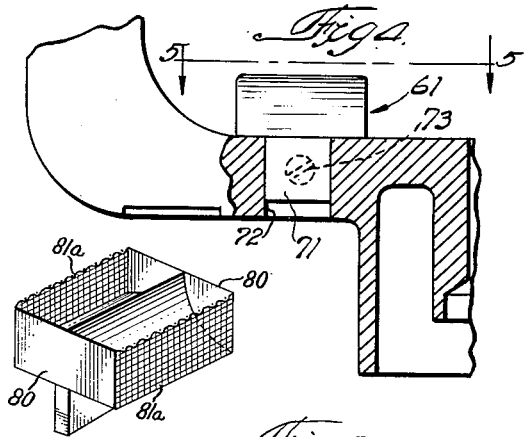
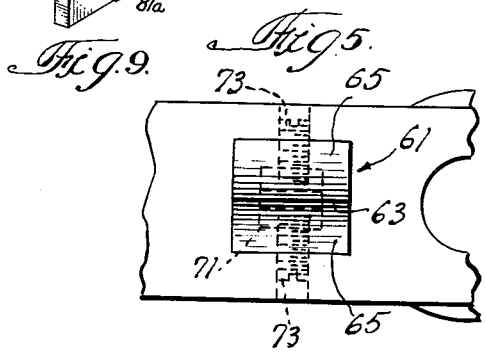
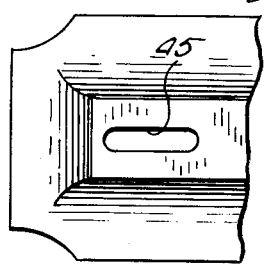
INVENTOR.
George Lester Jones
BY
Leonard Stass
Atty.

United States Patent Office 2,997,886
Patented Aug. 29, 1961

2,997,886
GYROSCOPES AND GYROSCOPIC INSTRUMENTS
George Lester Jones, R.R. 2, Marne, Mich.
Filed Jan. 20, 1960, Ser. No. 3,534
10 Claims. (Cl. 74—5.7)

This invention relates to improvements in gyroscopes and gyroscopic instruments.

Specifically, the invention, in one aspect has reference to improved means for leveling the horizontal gimbal ring of an air-driven directional gyroscope. One prevailing mode of effecting leveling in these instruments is to direct the air, after it has spent its force on the rotor, in a vertical jet from the rotor housing through a suitable orifice and to cause the same to impinge on a wedge-shaped member, secured to the vertical ring. The arrangement is such that, in the true vertical position of the ring the crest of this member, usually termed a plow, bisects the air jet which is then subdivided into two oppositely directed jets reacting substantially horizontally on each face of the plow. Providing the instrument is properly calibrated the horizontal jets experience equal and opposite reactive forces from the plow which are translated back to the horizontal ring as restoring torques and the gyro axis remains horizontal. If, however, due to drift the gyro spin axis departs from horizontal the jet from the rotor housing is subdivided unequally and the resultant difference in the reactive torques will then precess the gyro to restore the spin axis to horizontal and the reactive forces between the plow and air streams are restored to equilibrium.

Heretofore the orifice from the rotor housing has been circular and the jet impinging on the plow has been distributed somewhat broadly over the crest thereof. Consequently critical performance of the leveling means could not be obtained.

I have found that, for a given cross-sectional area of jet, optimum utilization of the leveling forces is obtained with an elongated orifice having its longitudinal axis aligned with the crest of the plow or, stated otherwise, the realization of more rapid and accurate leveling of the gyro for small degrees of displacement of its spin axis.

In another aspect the invention contemplates a plow for the purpose aforesaid wherein the concave or inclined, lateral surfaces thereof, i.e. those which divide and deflect the main jet, are terminated by a baffle at each end whereby to prevent the resultant split jet from spilling over. Thus, the correcting effect thereof is enhanced and unwanted precessive action avoided.

In still another aspect the invention comprises a plow for the purpose stated which includes a perforate wall confronting each of the deflecting surfaces to disperse the horizontal jets after they have performed their useful function whereby unwanted reactions on other parts of the instrument are reduced to inconsequence. Alternatively the perforate wall may also be provided at the ends of the plow.

In yet another aspect the invention incorporates a plow which is mounted for micrometric adjustment whereby calibration of the leveling means is much more easily effected than has hitherto been possible.

Regarded in another phase the invention incorporates a novel form of rotor casing and rotor bearing assembly whereby the cost of these components of the instrument is materially reduced.

In still another phase the invention includes improved signal means for providing a visual indication of failure of vacuum, having in view that the air passing through the instrument is not fed from an air compressor but has the necessary velocity imparted thereto by an engine-driven vacuum pump or a venturi tube.

Other objects and advantages of the invention will become evident from the ensuing description which, taken together with the accompanying drawings, discloses certain forms which the various aspects of the invention may assume in practice.

In these drawings:

FIG. 3 shows a portion of the rotor casing to illustrate my improved orifice for exhaust therefrom;

FIG. 4 is a detail of a portion of FIG. 1 to show the plow and its adjustable mounting;

FIG. 5 is a detail in plan taken in the direction of the arrows 5—5 in FIG. 4;

FIG. 6 is a detail in the direction of the arrows 6—6 of FIG. 3;

FIG. 7 is a detail, taken in the direction of the line 7—7 of FIG. 1, to show the relation of the crest of the plow to the exhaust orifice in the rotor housing;

FIG. 8 is a detail in perspective of a modified form of plow, and

FIG. 9 is a view similar to that of FIG. 8 to illustrate a further alternative form of the plow.

Figure 2:
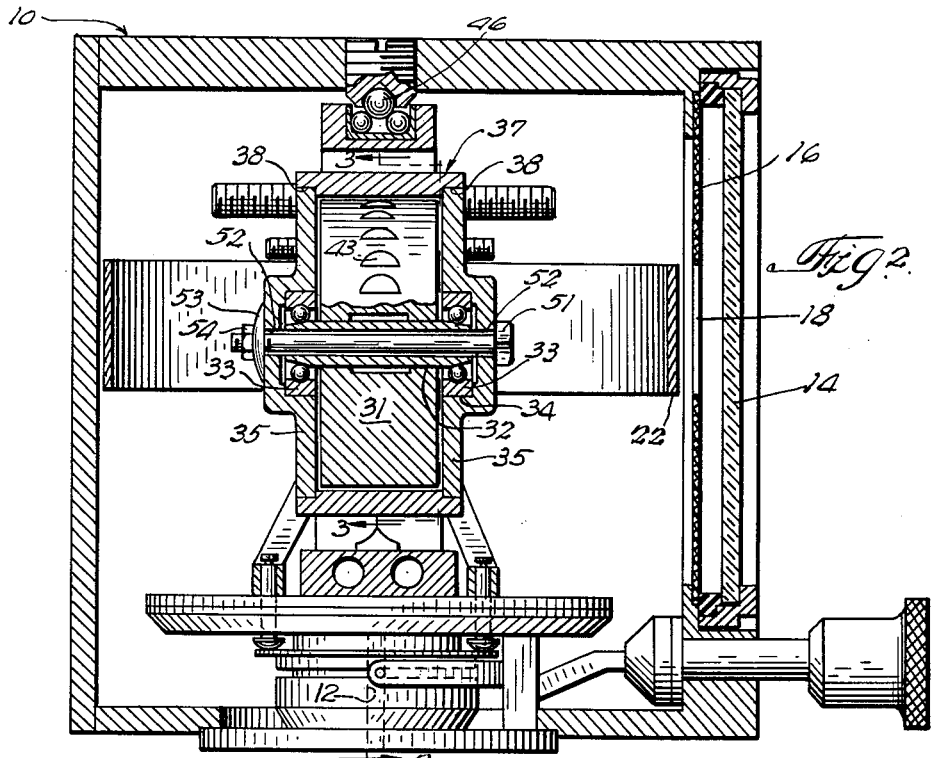
FIG. 2 is a vertical medial cross section through the instrument of FIG. 1.
Figure 1:
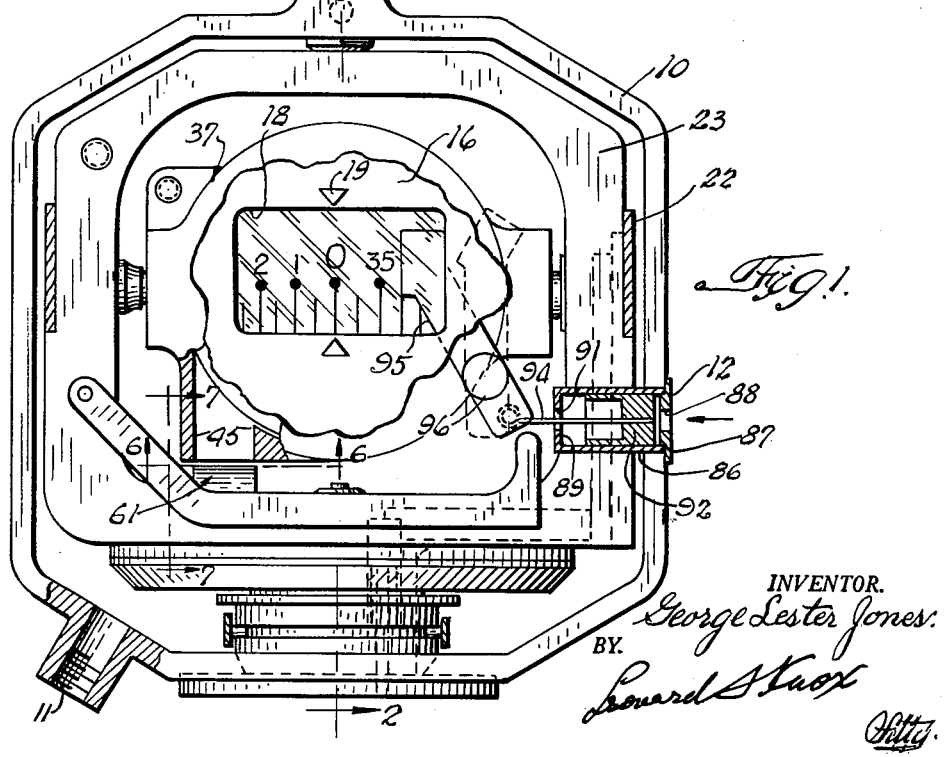
FIG. 1 is a front elevational view of a directional gyroscope embodying the invention.

Turning now to the drawings I have shown a directional gyroscope (FIGS. 1 and 2) comprising a housing 10 generally of box-like form which is essentially closed except for an air outlet port 11 for ultimate escape of air and an air inlet port 12. There is provided a front window 14, behind which is an opaque panel 16 having an opening 18 provided with a lubber line 19. This latter is read in connection with an annular dial 22 carried on the vertical gimbal 23, which latter is held stationary in space by the gyroscope while the housing 10 and the lubber line move with the aeroplane, as will be understood. Dial 22 is graduated over 360° in order that the heading of the aeroplane may be read.

The gyroscope rotor 31 (FIG. 2) is supported for rotation on a hollow shaft 32 provided with conical ends for engagement with ball bearings 33 at each end. These latter are received in suitable cavities 34 in each of the discs or end plates 35 constituting the sides of the rotor casing. A generally annular body member 37 (FIG. 3) serves as the principal portion of the rotor casing and is recessed on both flat sides as at 38 to receive the discs 35 with a snug, concentric fit. The body member 37 is bored at 41 to define suitable running clearance with the rotor and passage of air therebetween. Buckets 43 receive the driving force of the air stream. Air is admitted at a port 44 and is discharged at a port 45. The rotor casing is supported for rotation on a vertical axis with respect to the housing 10 by bearings, one of which is shown at 46.

While the tapered ends of the shaft 32 will permit reasonably close accommodation of the shaft by its bearings it is desirable to arrange for what may be termed "micrometric" adjustment of the bearing tolerance, for otherwise the rotor axis may shift eccentrically thereby to introduce unwanted precessional errors. In accordance with the invention the discs 35 are retained in their proper endwise relation with the body member 37 by means of a bolt 51 passing through bores 52 in the discs and through the center of the shaft 32. A dished, resilient washer 53 is placed over the bolt and a nut 54 serves to secure the assembly together. By reason of the elasticity of the washer 53 the nut 54 may be drawn up sufficiently to maintain the discs 35 in position and to preload the bearings 33 with a precision heretofore not possible. That is to say, no additional fastening means are required between the discs and body member. Consequently considerable saving in manufacturing and maintenance cost is realized. Additionally, the washer 53 constitutes a self-adjusting feature in that the same will accommodate dimensional changes due to temperature in the axial dimensions of the rotor casing and the shaft 32 whereby increase or decrease of the predetermined running tolerance between the shaft and its bearings is virtually cancelled.

As heretofore alluded to, air is discharged from the interior of the rotor housing through a port 45. Upon issuing from the port the air stream impinges on a substantially cuneate, desirably concave-sided plow 61 mounted on the gimbal 23 and, assuming that the crest 63 of the plow is suitably adjusted and the gyro axis is level the stream is bisected, so that the same continues, by virtue of the concave sides 65 of the plow, as two oppositely directed, substantially horizontal streams. As pointed out above, when the horizontally-directed force components of the split streams are equal the vertical rotor axis is stabilized but upon departure of the rotor axis relative to ring 23 the reactive components provide a differential torque which restores the rotor axis. In accordance with the invention I materially improve the sensitivity of the erecting arrangement by providing an exhaust port 45 which is, regarded in transverse cross section, elongated in the direction of the crest 63, having a longitudinal dimension substantially the same as the length of the crest 63 and aligned therewith. However the total cross sectional area of the port preferably is such as to preserve the rate of air flow existing with the circular orifice or port of prior instruments. Thus, without altering the rate of flow, except for negligible friction effects, the stream is caused to impinge over the entire length of the crest 63 and, when subdivided, thereby results in considerable enhancement of control. Stated otherwise, erection is rendered more readily responsive to departures of the vertical ring from vertical.

Furthermore, in accordance with the invention, I provide means for calibrating the erecting means with considerable accuracy. To this end the plow 61 is provided with a tongue 71 received in an aperture 72. The fit, in the direction of the crest 63, is just sufficient to allow sliding adjustment of the plow 61 in a direction perpendicular to the crest and, in the other direction, there is sufficient clearance for movement as regulated by a pair of screws 73. By employing the foregoing arrangement the plow may be moved laterally in one direction or the other with respect to the port 45 for calibration of erection.

As heretofore described the active, concave sides of the plow, per se, have been recognized in the art. However, I have found that the oppositely directed, reactive streams flowing at a substantial velocity are far from dissipated upon departure from the plow. As an undesirable consequence impingement of the residual streams on other parts of the gyroscope will initiate precession. To decelerate the streams and thereby reduce to a minimum the undesired precessive effects I provide, in accordance with another phase of the invention, stream decelerating means as shown in FIG. 8. As there depicted the periphery of the plow is bounded by walls of wire mesh 81 aligned with the crest 63 and preferably disposed vertically, i.e. normal to the essential direction of the opposed streams; the upstanding edges being supported by additional mesh walls 81a. Thus, the streams are subdivided or diffused into a plurality of finer streams which, in passing through the manifold interstices of the screens, are subjected to considerable friction and, therefore, diminution of velocity. The thus decelerated air streams have been found to reduce to a negligible factor precessive errors. Although I have illustrated the walls 81a also of mesh I prefer to make the same imperforate in order to confine the air streams to the concave faces of the plow where they will perform the intended erection function by extraction of maximum energy therefrom. This alternative form of the invention is illustrated in FIG. 9 wherein the imperforate walls are shown at 80 and the perforate walls at 81a.

In accordance with another aspect of the invention I provide improved means for indicating to the pilot that the vacuum has failed so that the rotor is no longer being driven or has been reduced to a point where the rotor speed is below what is suitable for reliable operation of the gyroscope.

To this end I provide an air inlet 86 in the form of a cylinder including an outer end wall 87 having a port 88 open to atmosphere and an inner end wall 89 having a port 91. A piston 92 is arranged to slide, with some predetermined clearance, in the cylinder and has a wire or rod 94 attached thereto. The distal end of the wire 94 is pivotally connected to one end of the flag 95 pivoted at 96 to the panel 16. The useful end of the flag may be distinctively colored, e.g. red and is so formed as to be presented in the window 18 or to be concealed behind the panel 16 (as indicated by broken lines). As long as appropriate vacuum is applied to the port 11 (FIG. 2) air flow through the port 88, between the cylinder and piston and through the port 91 will be at such velocity as to maintain the piston to the left and the flag is held concealed. Upon failure of vacuum the differential of pressure to which the piston is subjected will be such as to shift the piston to the right and the flag will be presented to view, thereby warning the pilot that the instrument is not functioning in its normal manner.

While I have shown particular embodiments of my invention, it will be understood, of course, that I do not wish to be limited thereto since many modifications may be made and I, therefore, contemplate by the appended claims to cover any such modifications as fall within the true spirit and scope of my invention.

I claim:

1. In an air-driven gyroscope means for restoring the rotor to its predetermined spin axis in consequence of departure thereof from said axis and in which the rotor is enclosed in a casing pivoted on a gimbal comprising: an air-exhaust passage in the wall of said casing, a plow mounted on the gimbal, said plow including a pair of opposed, air-deflecting faces meeting in an elongated crest confronting said passage for subdividing the stream of exhaust air issuing from said passage, said passage, at least at its outer terminus, having a transverse cross section which is elongated in the direction of the crest, the longer dimension of said cross section being substantially coextensive with the length of said crest.

2. The combination in accordance with claim 1 wherein said cross section is defined on its longer sides by straight, parallel lines.

3. In an air-driven gyroscope which includes means for restoring the rotor to its predetermined spin axis in consequence of departure thereof from said axis, in which the rotor is enclosed in a casing pivoted on a gimbal and in which the air stream exhausted from the casing issues through a passage for impingement on and subdivision by a substantially wedge-shaped plow mounted on the gimbal to provide reactive torque to restore the rotor spin axis to its predetermined position, the crest of the plow confronting the passage, the improvement which comprises: an opening in the gimbal, an extension on the plow shiftably received in said opening, and screw-threaded means common to the extension and gimbal for moving the plow in a direction transversely of the crest to adjust the differential action of the subdivided air stream on the plow.

4. The improvement in a substantially cuneate plow as used for levelling an air-driven gyroscope wherein the rotor is enclosed in a casing and the air is exhausted therefrom for impingement on and subdivision by the crest of the plow to provide a pair of oppositely directed air streams jointly providing a differential reactive torque on the casing to restore the rotor to its predetermined spin axis in consequence of departure thereof from said axis which comprises: a perforate wall positioned at each side of the plow parallel to the crest thereof and substantially normal to the direction of the respective air stream at the plane whereat the stream departs from the plow to diffuse and decelerate the stream at said plane.

5. The improvement in accordance with claim 4 further characterized by the provision of a perforate wall at each end of the plow positioned substantially perpendicularly to said first perforate walls and extending therebetween.

6. The improvement in accordance with claim 4, further characterized by the provision of an imperforate wall at each end of the plow positioned substantially perpendicularly to said perforate walls and extending therebetween.

7. The improvement in a substantially cuneate plow as used with an air-driven gyroscope wherein the rotor is enclosed in a casing and the air is exhausted therefrom for impingement on and subdivision by the crest of the plow to provide a pair of oppositely directed air streams jointly providing a differential reactive torque on the casing to restore the rotor to its predetermined spin axis in consequence of departure thereof from said axis which comprises: an imperforate wall at each end of the plow perpendicular to the crest thereof and substantially coextensive with the height and width of the active surfaces of the plow.

8. In a gyroscopic instrument which includes an essentially closed housing for an air-driven gyroscope, said gyroscope having a rotor and a casing essentially enclosing the same, the air driving the rotor entering the housing from atmosphere and being exhausted from the housing to a vacuum pump, said casing having inlet and outlet ports, gimbal means for supporting the casing, and a transparent window in one wall of the housing through which indicating means responsive to the position of the gyroscope relative to the housing may be viewed, the improvement which comprises: means defining a passage providing communication from atmosphere into the housing, a cylinder in communication with said passage, means defining an outlet from said cylinder to the interior of the housing, a piston guided in said cylinder for movement intermediate said passages, the position of the piston being under the control of the difference of pressure existing between atmosphere and the interior of the housing, a signal flag supported for movement between positions respectively visible in the window and invisible in the window, and means connecting the flag and piston whereby a predetermined value of difference of pressure between the ends of the piston will maintain the flag invisible and reduction in said difference of pressure to a predetermined lower value will present the flag in the window.

9. In a gyroscopic instrument which includes an essentially closed housing for an air-driven gyroscope, said gyroscope having a rotor and a casing essentially enclosing the same, the air driving the rotor entering the housing from atmosphere and being exhausted from the housing to a vacuum pump, said casing having inlet and outlet ports, gimbal means for supporting the casing and a transparent window in one wall of the housing through which indicating means responsive to the position of the gyroscope relative to the housing may ve viewed, the improvement which comprises: means defining a passage providing communication from atmosphere into the housing, a cylinder in communication with said passage, means defining an outlet from said cylinder to the interior of the housing, a piston guided in said cylinder for movement intermediate said passages, the position of the piston being under the control of the difference of pressure existing between atmosphere and the interior of the housing, signalling means adapted to be rendered invisible through the window to indicate a "safe" condition and to be presented visibly in said window to indicate an "unsafe" condition, and means connecting said signalling means and piston whereby a predetermined value of difference of pressure between the ends of the piston will actuate said signalling means into "safe" position and reduction in said difference to a predetermined lower value will actuate said signalling means into "unsafe" position.

10. In a gyroscopic instrument which includes an essentially closing housing for an air-driven gyroscope, said gyroscope having a rotor and a casing essentially enclosing the same, the air driving the rotor entering the housing from atmosphere and being exhausted from the housing to a vacuum pump, said casing having inlet and outlet ports, gimbal means for supporting the casing, and a transparent window in one wall of the housing through which indicating means responsive to the position of the gyroscope relative to the housing may be viewed, the improvement which comprises: means defining a passage providing communication from atmosphere into the housing means responsive to the difference in air pressure between atmosphere and the interior of the housing, signalling means adapted to be rendered invisible through the window to indicate a "safe" condition and to be presented visibly in said window to indicate an "unsafe" condition, and means connecting said air pressure responsive means to said signalling means whereby a predetermined value of difference of air pressure will actuate said signalling means into "safe" position and reduction in said difference to a predetermined lower value will actuate said signalling means into "unsafe" position.

References Cited in the file of this patent

UNITED STATES PATENTS

| | | |
|---|---|---|
| 2,015,650 | Bates | Oct. 1, 1935 |
| 2,025,194 | Carter et al. | Dec. 24, 1935 |
| 2,248,141 | Manteuffel | July 8, 1941 |
| 2,301,700 | Heintz | Nov. 10, 1942 |
| 2,315,019 | Samuelson | Mar. 30, 1943 |
| 2,345,169 | Wunsch et al. | Mar. 28, 1944 |
| 2,385,342 | Braddon | Sept. 25, 1945 |
| 2,602,334 | Tracy | July 8, 1952 |
| 2,720,602 | Dolude | Oct. 11, 1955 |
| 2,829,523 | Fischer | Apr. 8, 1958 |
| 2,857,534 | Beach | Oct. 21, 1958 |